United States Patent
Iovanna et al.

(10) Patent No.: US 10,397,107 B2
(45) Date of Patent: Aug. 27, 2019

(54) METHOD AND APPARATUS OF ADAPTING AN ASSOCIATION OF PHYSICAL RESOURCES WITH A SUMMARIZED RESOURCE

(71) Applicant: Telefonaktiebolaget LM Ericsson (publ), Stockholm (SE)

(72) Inventors: Paola Iovanna, Pisa (IT); Francesco Di Michele, Pisa (IT); Gianpaolo Oriolo, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 255 days.

(21) Appl. No.: 15/024,205

(22) PCT Filed: Sep. 30, 2013

(86) PCT No.: PCT/EP2013/070368
§ 371 (c)(1),
(2) Date: Mar. 23, 2016

(87) PCT Pub. No.: WO2015/043681
PCT Pub. Date: Apr. 2, 2015

(65) Prior Publication Data
US 2016/0234109 A1    Aug. 11, 2016

(51) Int. Cl.
*H04L 12/721* (2013.01)
*H04L 12/715* (2013.01)
(Continued)

(52) U.S. Cl.
CPC .............. *H04L 45/70* (2013.01); *H04L 41/12* (2013.01); *H04L 43/08* (2013.01); *H04L 43/0817* (2013.01); *H04L 43/0882* (2013.01); *H04L 43/16* (2013.01); *H04L 45/02* (2013.01); *H04L 45/04* (2013.01); *H04L 45/245* (2013.01);
(Continued)

(58) Field of Classification Search
None
See application file for complete search history.

(56) References Cited

U.S. PATENT DOCUMENTS 7,752,024 B2 * 7/2010 Ball .................. H04L 41/12
703/1
8,014,275 B1 * 9/2011 Sundt .............. H04L 41/0668
370/217
(Continued)

FOREIGN PATENT DOCUMENTS

WO    WO2011/103913    *    9/2011
WO    2013079225 A1    6/2013

OTHER PUBLICATIONS

Farrel, A. et al., "A Path Computation Element (PCE)—Based Architecture", IETF RFC-4655, Aug. 2006, 1-40.
(Continued)

*Primary Examiner* — Saba Tsegaye
(74) *Attorney, Agent, or Firm* — Patent Portfolio Builders, PLLC (57) ABSTRACT

A method of adapting an association of physical resources with a summarized resource in a hierarchical routed network. The method comprises monitoring at least one parameter of the physical resources. The method comprises adapting the association of physical resources with the summarized resource, based on the monitoring.

20 Claims, 4 Drawing Sheets

(51) Int. Cl.
*H04L 12/751* (2013.01)
*H04L 12/709* (2013.01)
*H04L 12/24* (2006.01)
*H04L 12/26* (2006.01)
*H04L 12/891* (2013.01)
*H04L 12/803* (2013.01)

(52) U.S. Cl.
CPC ............ *H04L 45/46* (2013.01); *H04L 47/125* (2013.01); *H04L 47/41* (2013.01)

(56) References Cited

U.S. PATENT DOCUMENTS

| | | | |
|---|---|---|---|
| 2002/0097747 A1* | 7/2002 | Kirkby | H04L 41/5022 370/468 |
| 2008/0298236 A1 | 12/2008 | Ervin et al. | |
| 2013/0070638 A1 | 3/2013 | Iovanna et al. | |

OTHER PUBLICATIONS

King, D. et al., "The Application of the Path Computation Element Architecture to the Determination of a Sequence of Domains in MPLS and GMPLS", Internet Engineering Task Force (IETF), Request for Comments: 6805, Category: Informational, ISSN: 2070-1721, Nov 2012, pp. 1-33.

Zhang, F. et al., "Extensions to Path Computation Element Communication Protocol (PCEP) for Hierarchical Path Computation Elements (PCE)", IETF Network Working Group Internet Draft, Intended status: Experimental, Expires: Feb. 18, 2014, Aug. 18, 2013, pp. 1-15.

* cited by examiner

METHOD AND APPARATUS OF ADAPTING AN ASSOCIATION OF PHYSICAL RESOURCES WITH A SUMMARIZED RESOURCE

TECHNICAL FIELD

Aspects of the invention relate to a method and apparatus of adapting a summarised resource. The summarised resource is in a hierarchical routed network.

BACKGROUND

Hierarchical routing and network summarization are approaches realized in order to solve scalability issues for routing in a multi-domain scenario. The global topology of a multi-domain network comprising a huge number of nodes can cause scalability issues.

A hierarchical path calculation element (PCE) for multi-domain scenario is described in IETF RFC-4655. In this model there are two levels of path computation. The high level is named Parent PCE and it is responsible for end-to-end (E2E) path computation. It works on a virtual topology composed by a set of summarized domains. The low level is composed by a child PCE that has the complete vision of a single domain. Each child PCE provides the summarized topology to the Parent PCE that composes the E2E virtual topology of all domains.

Summarization, in a multi-domain context, is a way to depict a network physical resources set with a logical network, in order to reduce the amount of topology information to be distributed through the physical network. This decreases routing computation time and preserves confidentiality of each domain.

It is not known to provide Traffic Engineering (TE) paths that can efficiently adapt resources without any knowledge of the end-to-end traffic and network status.

SUMMARY

A first aspect of the present invention provides a method of adapting an association of physical resources with a summarized resource in a hierarchical routed network. The method comprises monitoring at least one parameter of the physical resources. The method comprises adapting the association of physical resources with the summarized resource, based on the monitoring.

Thus, the physical resources associated with a summarized resource can be varied or increased according to the traffic routed over that summarized resource.

A first aspect of the present invention provides an apparatus configured to adapt an association of physical resources with a summarised resource in a hierarchical routed network. The apparatus comprises a monitoring unit configured to receive information on at least one parameter of physical resources associated with a said summarized resource. The apparatus further comprises a calculation unit configured to adapt the association of physical resources with at least one of said plurality of summarized resources, based on the monitoring.

According to another aspect of the present invention, there is provided a computer program product, configured when run on a computer to conduct a method according to any one of methods defined in the appended claims.

BRIEF DESCRIPTION OF THE DRAWINGS

Embodiments of the present invention will now be described, by way of example only, with reference to the accompanying drawings in which.

DETAILED DESCRIPTION

Figure 1:
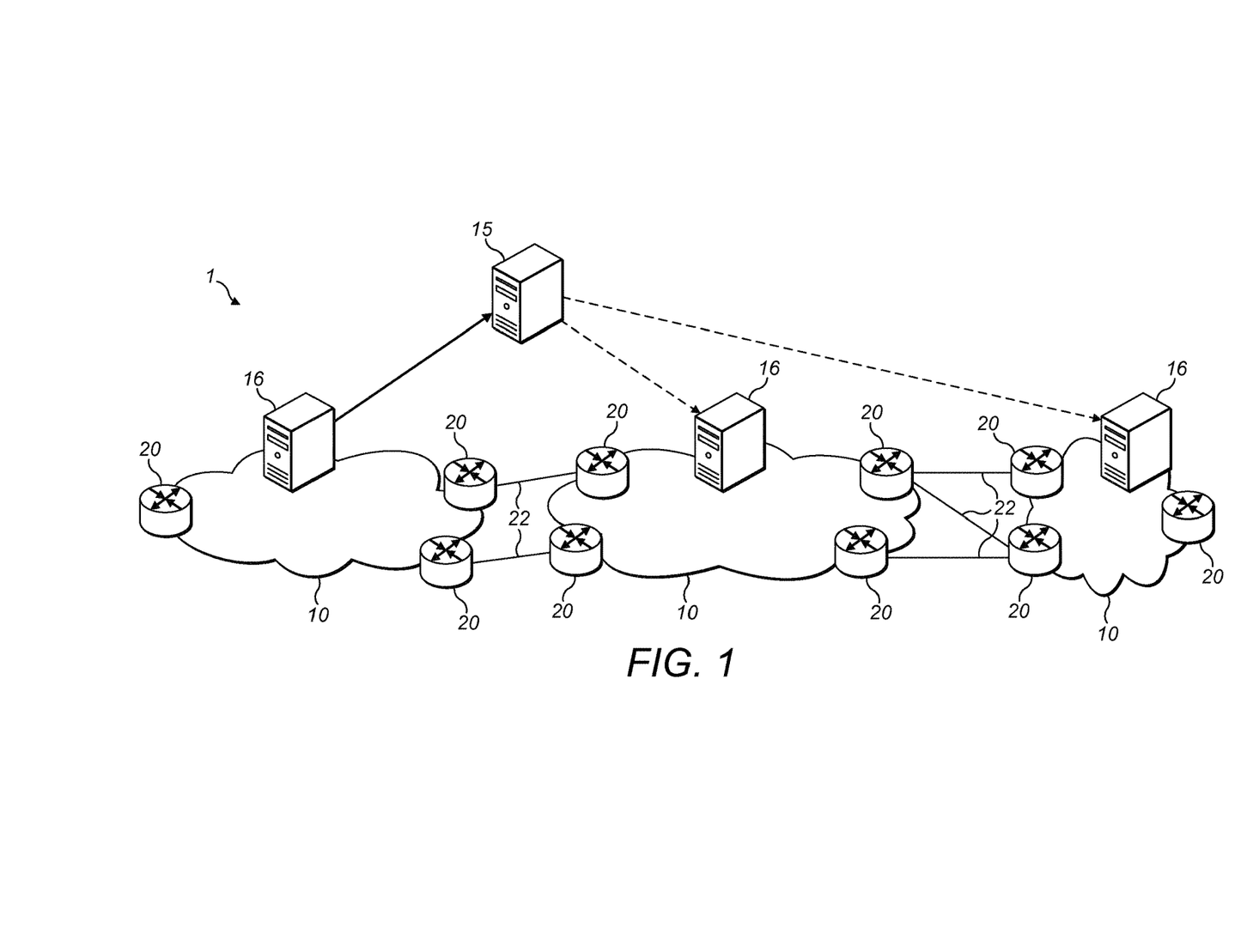
FIG. 1 shows an example of a network according to an example of the invention.

FIG. 1 shows an example of a hierarchical Path Computation Element (PCE) architecture in a network 1 in which examples of the present invention are based. In this architecture, PCEs are organized in multiple levels. For example, the high level PCE is named the Parent PCE 15 and is responsible for the E2E path computation. The parent PCE works on a virtual topology comprising one or more summarized domains 10. The low level is composed by a child PCE 16 that has full information on a single domain. The child PCE provides a summarized topology to the Parent PCE 15, e.g. for composing a virtual topology of all domains.

In the network 1, a plurality of domains 10 comprises a plurality of network nodes 20. For example, the network nodes 20 are edge nodes 20 having one or more inter-domain links 22 to an edge node 20 of another domain.

The child PCEs 16 are connected to a parent PCE 15. Each child PCE does not have information of the whole network. The PCEs are arranged as one or more parent PCE 15 or one or more child PCE 16. The examples are described for only one parent PCE, and may be extended to a plurality of parent PCEs.

The parent PCE 15 is responsible for selecting a path crossing an E2E domain and any number of child domains by coordinating with child PCEs. The parent PCE 15 examines a topology map that shows domain inter-connectivity. In some examples, the parent PCE 15 is only aware of the connectivity among the domains, and provides coordination to the child PCEs 16. The parent PCE 15 may alternatively be termed a top PCE, or upper-hierarchical PCE.

The child PCEs 16 are responsible for computing the path across one or more specific (child) domains. Each domain 10 has an associated child PCE 16. A child PCE 16 maintains a relationship with at least one parent PCE 16. The child PCE 15 may alternatively be termed a PCE, subsidiary PCE or PCE for computing the path across a domain 10.

The arrangement and number of domains is not limited by the example shown in FIG. 1. For example, the network 1 may comprise a further domain 10 connected to any one or more of the domains shown.

In an example, a path request is sent to the parent PCE 15, which communicates with the child PCEs 16 about their connectivity between the candidate intra-domain connections. Once the answer is known, the best solution is selected and the solution is transmitted to the source child PCE 16. This hierarchical model is applicable to an automatic switched optical network (ASON). In particular, the network is composed by sub-networks and the routing areas have relationship between peers.

A PCE 15,16 is an entity that is capable of computing a network path or route based on a network graph, and of applying computational constraints during the computation.

The PCE 15,16 is an entity or application that can be located within a network node or component, on an out-ofnetwork server, or at any location where the PCE can provide its function. For example, a PCE 15,16 is able to compute the path of a Label Switched Path (LSP). For example, by operating on a Traffic Engineering Database (TED) and considering bandwidth and other constraints applicable to the TE LSP service request.

A domain is any collection of network elements (or nodes) within a common sphere of address management or path computation responsibility. Examples of domains include Interior Gateway Protocol (IGP) areas, Autonomous Systems (AS), and multiple AS within a Service Provider network. Domains of path computation responsibility may also exist as sub-domains of areas or AS.

An example of the invention is applicable to an optical network. One or more intra-domain links and/or inter-domain links 22 comprises optical connections. The network nodes 20 and further nodes within the domains 10 are optical nodes. For example, the optical nodes are configured for optical switching, e.g. as optical cross-connects. In some examples, the network elements or nodes may not have a control plane or routing capability. Such network elements only have a data plane and a management plane, and all cross-connections are made from the management plane. It is possible to run the path computation on the child PCE 16, and to send the cross-connection commands to each node on the computed path. Any client application requesting a path computation to be performed by the Path Computation Element may be termed a Path Computation Client (PCC), e.g. a Label Switch Router (LSR). In some examples, a PCC would be an element of the management plane, e.g. residing in a Network Management System (NMS) or Operations Support System (OSS).

In some examples, the network 1 uses a connectionless communication or a connection-orientated communication. At least part of the network 1 according to an example of the invention may route traffic using label switched paths (LSPs). In some examples, the network 1 utilizes Multi-Protocol Label Switching (MPLS) or Generalized Multi-Protocol Label Switching (GMPLS). In some examples, the network nodes switch traffic based on wavelength (lambda-switching) or timeslot (e.g. a data unit in a time-division multiplexed signal, e.g. in SDH/SONET). Aspects of the invention are applicable to a Software Defined Network. Aspects of the invention are applicable to Automatically Switched Optical Network (ASON)-capable networks. Aspects of the invention may also be used for interworking between GMPLS-capable and GMPLS-incapable networks.

Aspects of the invention determine which portions of a network require a new resource distribution. In some examples, aspects of the invention comprise at least one monitoring mechanism which monitors or supervises how the resources are used within a domain. In some examples, the at least one monitoring mechanism triggers a summarization phase and/or resource adjustment, e.g. for intra-domain resources.

Figure 2:
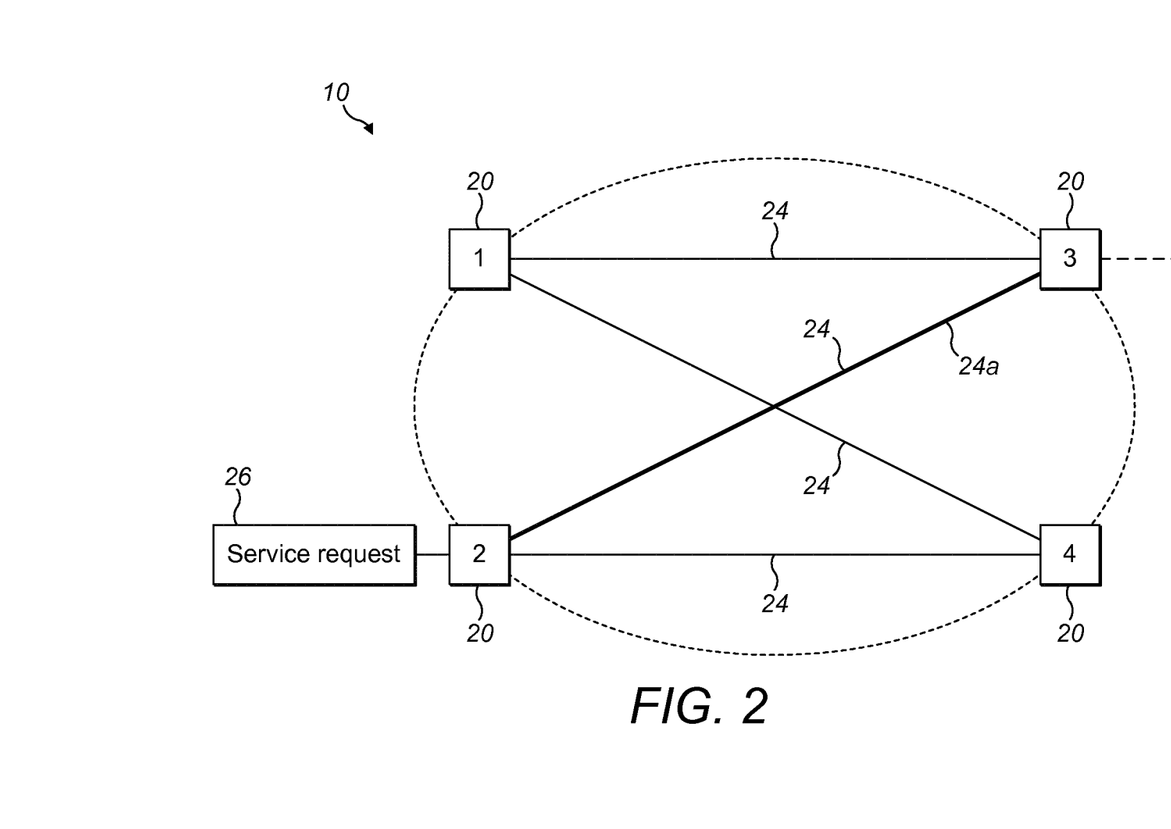
FIG. 2 shows an example of a domain according to an example of the invention.

FIG. 2 shows an example of a domain 10, having border network nodes 20. In this example, the domain 10 comprises four border nodes 20. The nodes 20 are connected by a mesh of links 24. The links 24 shown are examples of summarized or virtual links or resources. The links 24 may indicate a logical connection between the nodes 20, used by the parent PCE 15. The summarized resource or link is a summary of physical resources, provided to the Parent PCE to simplify E2E routing. The links 24 are generally implemented with further network nodes or elements (not shown). The child PCE 16 is configured to calculate how network nodes within the domain 10 are configured to obtain the summarized links 24 shown. The traffic can be considered as routed hierarchically.

In examples, a service request 26 is received on network node 2 from outside of the domain 10. The request is for a path to network node 3, and so link 24a is utilized. The traffic exits the domain 10 on a connection 28 to another domain. The link 24a is an example of a summarized resource used by the Parent PCE for end-to-end routing.

Figure 3:
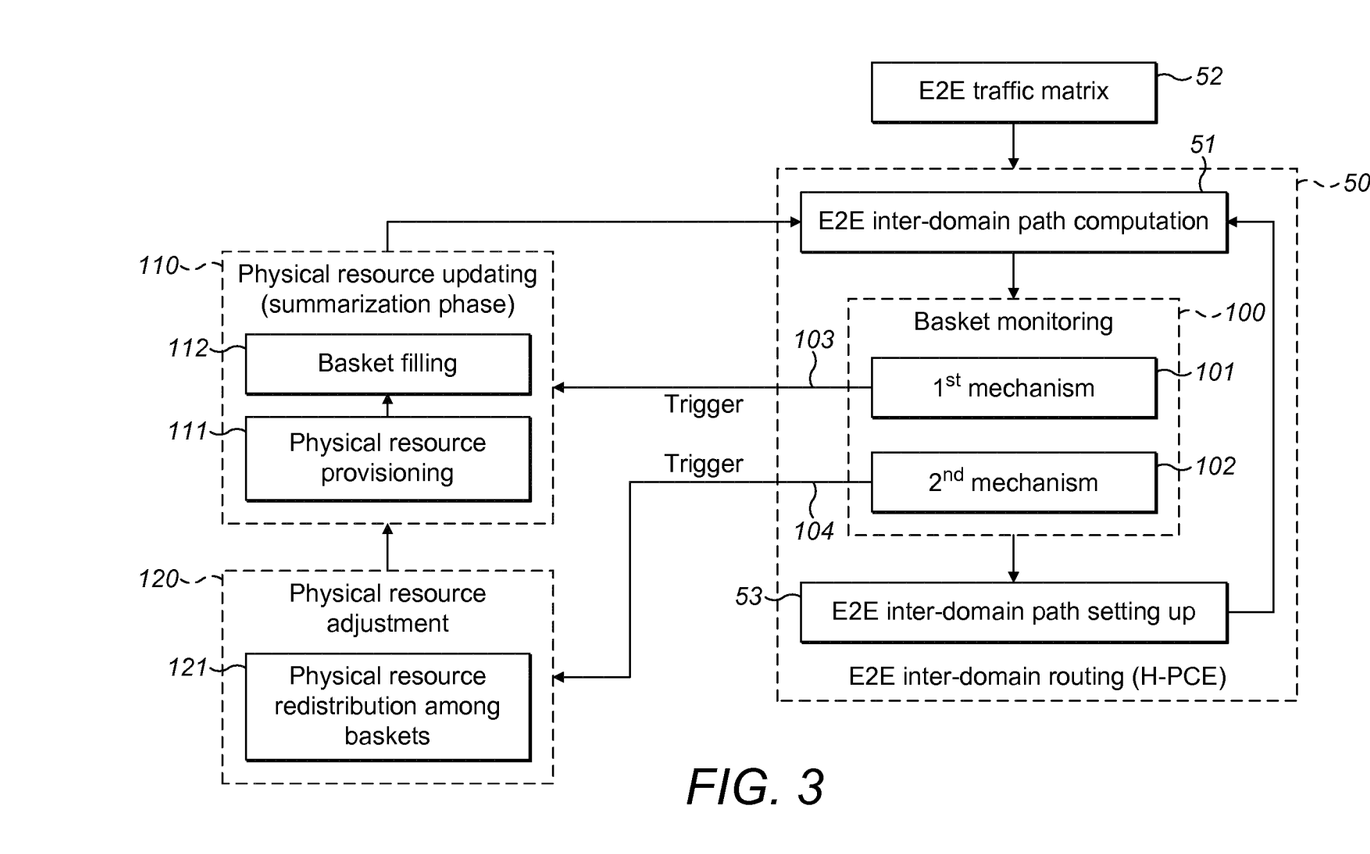
FIG. 3 shows a flowchart illustrating steps according to an example of the invention.

FIG. 3 shows an example of a monitoring 100 along with exemplary aspects of an end-to-end (E2E) routing 50. The monitoring 100 is independent of the routing 50. In the routing 50, an end-to-end inter-domain path computation 51 is carried out. The path computation 51 comprises at least the parent PCE 15. Assuming that a valid path is computed, an end-to-end inter-domain path is set up in step 53. The parent PCE 15 communicates with the child PCE 16 in each relevant domain to set up the end-to-end path. The end-to-end path includes at least one domain, and may include a plurality of domains.

The monitoring 100 according to an aspect of the invention is arranged to monitor the status of the physical resources within a domain as a result of the end-to-end paths set up. As such, aspects of the present invention do not monitor the actual end-to-end path set up, but only the effect on the physical resources within a domain 10. In some instances, the physical resources within a monitored domain 10 may be only a part of the end-to-end path. Such a method allows deriving dynamically the correct map of resource availability. The monitoring 100 is asynchronous with respect the routing, in order to avoid stability and scalability issues. For example, calculations described by examples of the invention may be carried out in parallel to routing of traffic. In some aspects, the summarization according to examples of the invention and routing may be considered as asynchronous.

In an example, the monitoring 100 comprises a plurality of mechanisms, for example, a first mechanism 101 and a second mechanism 102. The monitoring mechanisms 101, 102 monitor how physical resources in the domain are used. The physical resources are paths (e.g. within the domain 10), or paths to be computed (e.g. within the domain 10).

In some examples, the mechanisms 101,102 are at least partially independent of each other. The monitoring mechanisms may be independent, or partially independent. For example, the plurality of monitoring mechanisms use one or more of the same parameters of the resources. In some aspects, the triggering and/or processes of the first mechanism 101 second mechanism 102 are independent.

A set of physical resources that correspond to a summarized resource (link) is referred to as a basket. For example, the basket represents the set of physical paths associated with a summarized link. The monitoring 100 is arranged to monitor one or more parameters of the basket. The physical resources, or basket, associated with a summarized resource may refer to the network nodes (e.g. routers) or to the paths. The summarized resources are used by the parent PCE 15 to form a virtual topology for calculating the end-to-end path. Each domain comprises a plurality of summarized resources or links. For example, the summarized resources or links are the links 24 connecting the border nodes, or connecting other nodes in the domain. Each domain comprises a plurality of baskets, one for each summarized link. Summarization is a method used to represents physical resources (paths) in a "summarized" topology.

Aspects of the invention apply in case of any type of summarization. Aspects of invention apply to the hierarchical approach for routing (e.g. using hierarchical PCEs), e.g. with two levels of routing. Examples of the invention are independent of the method of summarization. Aspects of the invention are carried out in combination with any method of summarization.

Aspects of the invention relate to adapting an association of physical resources with a summarized resource. Examples of the invention determine how the association is changed. As such, the summarized resource is considered to be changed or adapted. In particular, having different physical resources associated with a summarized resource is considered to be a change or adaptation of the summarized resource.

In some examples, the monitoring 100 measures a first parameter of the basket status relating to available physical resources. The parameter corresponds to a handling of traffic by the physical resources associated with the summarized resource. For example, the number of available physical resources may be considered as a parameter relating to the handling of traffic. The first mechanism 101 is defined as monitoring the first parameter.

In some examples, the monitoring compares the available physical resources (e.g. intra-domain paths) with one or more thresholds. For example, the available physical resources are compared with a first threshold for indicating if the available physical resources are low. In particular, the number of available physical resources (e.g. intra-domain paths) is compared with a threshold. The basket status may be termed a Critical state if the available physical resources are below this threshold.

In an example of the first mechanism 101, the summarization method should be triggered when in the basket there are fewer available physical paths than the threshold, i.e. in the basket there a fewer available paths than the threshold which are not used yet to route the E2E traffic requests. Available resources are resources not yet used to route the E2E traffic. Baskets are filled only by available resources.

When this threshold is reached, additional physical resources should be provided for representing the summarized link. In some examples, the available physical resources are intra-domain paths. This allows providing the physical resources to the summarized resource before the traffic requires a connection. In some aspects, the method provides the physical resources to the summarized resource independently from the traffic request. The providing of resources is independent from the traffic request arrival time.

The threshold below which the available physical resources of the basket indicates additional physical resources should be provided may, for example, be 10% of the initial evaluation.

When the basket status is considered Critical (i.e. available basket resources are lower than the first threshold) the first mechanism 101 launches a command to compute a new summarization phase for that critical basket. Summarization will be computed taking into account the current physical resource evaluation. The summarization is computed directly (i.e. immediately) following the detection that the number of available physical resources is below the first threshold. Details of the summarization are described below.

In some examples, each basket is assigned a number of paths and thresholds. All of the assigned paths can be used by that summarization. As the basket is filled with intra-domain paths, the basket may reach the critical threshold of having relatively few available physical resources (intra-domain paths) remaining. The first mechanism triggers the domains 10 to provide more physical paths for the summarized resource. In this case, in the physical resource updating, the amount of physical resources (basket) that the domain assigns to a summarized link is the same.

In some examples, the evaluation of resources to a basket is in terms of the available physical resources. For example, the summarization method restores to the summarized resource the same number of available physical resources as previously calculated. The system aims to provide all possible physical resources according to the summarization criterion used in the previous step. If the summarization criterion fixed the amount of (available) physical resource to assign to the basket, the same criterion applies. Alternatively, the additional physical resources provided to the basket may be in terms of a percentage of the original allocation of physical resources, or an absolute number of additional physical resources.

The fact that a threshold is reached means that some physical resources in the basket have been used. The summarization provides further resources to reach again the initial number of (available) resources in the basket. In case it is not possible and there are not sufficient available physical resources, the second mechanism reveals the lack of sufficient available physical resources (due to the fact that the critical threshold is frequently reached) triggers a re-organization of intra-domain resource to deal with the situation.

In some examples, the available physical resources are compared with a second threshold, in the first mechanism 101. The second threshold may indicate that the basket status is Slack. For example, this basket status is determined if the available physical resources (i.e. intra-domain paths) number is less than 30% of the initial evaluation. If the available physical resources are less than the second threshold (and greater than the first threshold), this indicates that the available physical resources are relatively low, but not yet critical.

When basket status is determined to be Slack, the first mechanism 101 provides a notification of the lack of resources. For example, the notification is provided to the entity which carries out the summarization. In some examples, the child PCE carries out the summarization. In some aspects, the notification of the lack of resources from the 'Slack' determination may be used for a triggering mechanism for the summarization. The triggering mechanism may be more complex than the trigger above. For example, the summarization of the first mechanism may be triggered by a plurality of instances of a 'Slack' determination within a particular time interval. If the available physical resources are greater than the second threshold, the basket status is considered as Regular. In this status, the available physical resources (i.e. intra-domain paths) are large enough that no action is required at that time to meet the demand.

In some examples, the criterion used to assign the threshold and/or amount of resource evaluation depends on the initial knowledge of the traffic matrix being serves, is a forecast, or based on any information. The threshold(s) may be the same for each basket or different between a plurality of baskets. Any threshold may be fixed, or may be changed according to one more further parameter. For example, a threshold may be changed according to a time needed to set up further physical resources to be available, or the rate at which the available physical resources are being used. For example, if a large amount of time is needed to include additional physical resources with a summarization basket and/or the available physical resources are known to be used rapidly, then a larger first and/or second threshold may be set (e.g. 15% and 35% respectively). In some examples, the threshold(s) are set as amounts of traffic or demands rather than a percentage.

When the first mechanism 101 detects a critical basket status (as described above), a physical resource updating (summarization phase) 110 is triggered 103. The physical resource updating 110 comprises a physical resource provisioning 111 and a basket filling 112.

The physical resource provisioning 111 comprises providing more physical intra-domain resources (e.g. paths) for the summarized resource. In some examples, it is realized taking into account the original distribution only for the critical basket. In some examples, the method searches for the critical basket an amount of resources which is identical to the initial distribution. The initial distribution is an evaluation of the resources to be provided for the summarized resource. Not all the available physical resources are associated to the summarized resources at the beginning of the E2E process, only an evaluation (original distribution) of the physical resources.

The physical resource provisioning 111 does not distribute the amount of physical resource in a different way. In particular, the first mechanism does not involve a re-allocation of physical resources from another basket to the critical basket. The additional physical resources are based on the original allocation or evaluation of that summarized link. The additional resources provided come from available network resources. Available network resources are all the resources that are not reserved to other baskets or utilized by a routed traffic request.

The basket filling 112 allocates intra-domain paths to the summarized resource. This provides part of the E2E routing calculated by the parent PCE and child PCE. The basket filling is a part of summarization phase where the provided physical resources are associated to a summarized resource. The physical resources are provided, allocated to the basket (basket filling) and finally associated to the summarized resource by the summarization method. For the first mechanism, the amount of available physical resources that the domain assigns to a summarized link (basket) is the same.

The first mechanism 101 is configured to trigger 103 the domain to associate more physical paths to the summarized resource. The first mechanism uses one or more thresholds, e.g. three levels, to identify where further physical resources should be provided. In some examples, an exhaustive list of all physical resources cannot be provided. The physical resources are provided as the summarized resource before the traffic requires a connection. In some aspects, the physical resources are provided as the summarized resource whenever the physical resources are required. In some aspects, the providing is independently from the E2E routing.

This allows a domain to use proper mechanisms to do so, e.g. PCE; control plane or Network Management System (NMS). Moreover in case of packet and optical technology, aspects of the invention allow each domain to operate independently to each other. While the resources are used, the mechanisms of examples of the invention apply.

The parameter involved in the first mechanism is only the basket status; whenever a basket becomes "critical" the first mechanism triggers the summarization phase. The summarization phase is only for the critical basket, taking into account the initial resource distribution.

The basket status variation from "regular" to "slack" and from "slack" to "critical" is related to the E2E routing. Whenever a basket is involved in the E2E routing the amount of resource decrease due to routed traffic, so the basket status is updated.

FIG. 3 also shows the second mechanism 102. The second mechanism 102 is triggered 104 by a pre-determined event, or a criteria, is met. In some examples, the criteria or event is not associated with the current status of the baskets or handling of the traffic. For example, the second mechanism 102 is triggered 104 at one or more particular times or one or more time intervals. For example, the second mechanism 102 is triggered at a pre-determined time interval.

The second mechanism 102 is based on a monitoring of a plurality of baskets within a domain, for example, all of the baskets within a domain. The second mechanism 102 is configured to compare baskets. This is in contrast with the first mechanism. The second mechanism 102 is arranged to redistribute physical resources among the baskets, based on that comparison.

The second mechanism 102 comprises the monitoring of one or more parameters of the baskets. In this example, the second mechanism 102 comprises monitoring a second and a third parameter. In some examples, the second and third parameters correspond to a handling of traffic by the physical resources associated with the summarized resource. In some examples, the adapting of the second mechanism 102 is based on the measurements of the at least one parameter since the last adaptation by the second mechanism. In some aspects, the adapting is based on measurements of the at least one parameter in the previous time interval.

The second parameter of the second mechanism 102 is based on the critical state of the basket, as described above. The basket may be considered as critical if the available physical resources associated with a summarized resource are less than a threshold value. For example, the second parameter for a basket is a count of the number of times that basket has entered the critical state. The basket may be considered as entering the critical state when the available physical resources is below a critical threshold and/or when the first mechanism is triggered. The count may be over a pre-determined amount of time and/or since the previous triggering of the second mechanism.

In some examples, the determination of whether a basket is in a critical state is used by both the first and second mechanisms. The first mechanism uses the determination of whether the available physical resources are below a threshold as a trigger for a summarization phase. The second mechanism uses the determination of whether the available physical resources are below a threshold as a basis for the adapting, e.g. determining how many or which physical resources should be included within a particular summarized resource.

The third parameter used by the second mechanism 102 is based on the amount of resources identified as lacking. For example, the third parameter is a count of the not served demand, due to the lack of resources of the basket. In some cases, there are traffic demands which did not find routes. The third parameter is a count or measure of this not served demand. The third parameter may be a measure of the amount of bandwidth corresponding to this not served demand and/or a measure of the number of traffic demands which were not served. The not served demand may be considered as an amount of additional physical resources required. The third parameter may be considered as a parameter of handling the traffic by the physical resources. For example, the not served demand relates to the excess traffic which cannot be handled by the physical resources.

Alternatively, the third parameter may not be considered as a parameter which corresponds to a handling of traffic.

When the second mechanism is triggered, a physical resource adjustment 120 of the baskets is carried out. The physical resource adjustment 120 comprises a physical resource redistribution 121 among the baskets of a domain. The physical resource redistribution 121 is based on the at least one parameter, e.g. the second and third parameters described above. In some examples, a corresponding physical resource provisioning 111 and basket filling 112 as described above as part of the physical resource updating 110 may be considered as further steps of the second mechanism 102.

The updated physical resources are known by the child PCE 16 of that domain. In some examples, the updating of the physical resources does not affect the summarized or virtual topology of the domain. In this case, the parent PCE 15 may not be notified of the changes. In other examples, the updating of the physical resources does affect the summarized or virtual topology of the domain. In this case, the parent PCE 15 is notified of the changes, e.g. by the child PCE 16. The updated physical resources are used by the parent PCE 15 and child PCE 16 in further hierarchical routing of end-to-end traffic.

The first mechanism 101 is performed whenever a basket needs a physical resource surplus independently from the observation time slot. The second mechanism 102 is performed at the end of each observation time slot.

Figure 4:
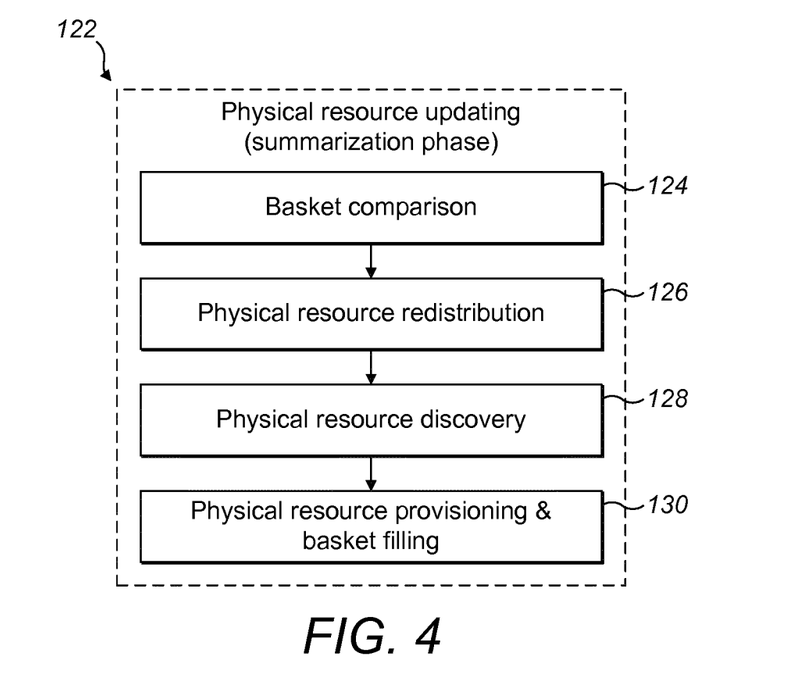
FIG. 4 shows a flowchart illustrating steps according to an example of a part of the invention.

FIG. 4 shows further details of the second mechanism. The flowchart illustrates exemplary aspects of physical resource updating 122 carried out as part of the second mechanism. The physical resource updating 122 is a combination of the physical resource adjustment 120 and physical resource updating 110 described above, with additional details. The second mechanism 102 is based on a monitoring of baskets in terms of resources which are lacking. The second mechanism identifies the baskets for which resources are lacking, and in some examples, identifies the amount of resources which are lacking. In some aspects, the second mechanism identifies a source of resources to be redistributed to the baskets for which further resources are needed.

When the second mechanism 102 is triggered, the baskets are compared in a comparison 124. For example, some portions of the network support more traffic than others. The summarized resources supporting more traffic, i.e. which are more used, are identified with the one or more parameter. In particular, the second parameter is used to rank the baskets. For example, the count of critical levels of physical resources below a threshold increases for baskets which are more used.

The comparison or ranking of the basket allows identification of which basket(s) need a different resource distribution. In some examples, the comparison or ranking also identifies physical resources which are under used, and can be transferred to a summarized resource which has a higher need.

If the second parameter is substantially the same for all the baskets, the resource distribution is considered to fit with the traffic/network needs. This indicates that redistribution is not required. If a rate, e.g. parameter indicating available physical resources, differs between the baskets (higher or lower with respect to the average), the second mechanism indicates that the resources in the domain should be organized in a different way.

In an example of the comparison 124, the baskets are rated in a descending order, according to the second parameter used in the second mechanism, in order to define how the summarized resources are used. High rates represent that the summarized link is strongly used during the routing phase, and low rates represents a smaller utilization.

In 126, the second mechanism 102 calculates how to redistribute the resources among the domain summarization links. High rate links need additional resources in order to satisfy the connection request coming to the Parent PCE. Low rate links have excess resources.

During this step, the second mechanism computes the new physical resource evaluations for high rate summarized links in order to increase their connection availability. The calculation of the new physical resource evaluation is based on the third parameter, i.e. the not served demand. The new evaluation is arranged to provide sufficient physical resources to the summarized link, including the handled demand and the not served demand. Therefore, the new evaluation of physical resources should be sufficient to handle future traffic. The physical resources are taken from baskets which are determined by the ranking to have excess resources.

Thus, aspects of the method quantify the amount of resources a basket should be increased to serve the future traffic demands. In the case that there are some traffic demands that did not find routes, the method computes the correspondent amount of bandwidth. Then the method tries to make available such amount of bandwidth. The method requires that the basket(s) that are relatively not used to free such bandwidth. The method increases the physical resource evaluations for high rate links taking into account the amount of resources needed to satisfy the demand not served, e.g. in the previous time slot. A new evaluation will be the input of summarization phase and will take part in the computing of basket status parameters for the next time slot. The summarization is a set of process that provides a homogenous representation of a plurality of resources.

In some examples, the second mechanism 102 adjusts the basket status threshold(s) used, e.g. set up originally at e.g. 10% and 30% for the critical and slack thresholds.

A further step 128 of the second mechanism 102 launches the command to release the discovered resources for the high rate links. After the redistribution, the second mechanism triggers the summarization method which discovers the physical resources for all of the baskets on the domain, i.e. physical resource discovery. This provides the resources for all the baskets that need to have resources. The mechanism to relate physical resources with summarized resources provides an improved allocation of resources.

In a further step 130, the method associates the discovered resources with the related summarization links, i.e. physical resource provisioning & basket filling. The second mechanism 102 launches the command to compute a new summarization phases for all the summarized links, taking into account the new physical resources evaluations. The summarization method is according to a known summarization method, although based on the redistributed physical resources. In the redistribution step 126, the mechanism calculates only the evaluation of the resources for all baskets. In the provisioning 130 the resources are provided to the baskets. The provisioning 130 is based on the results of the monitoring.

The method and apparatus according to examples of the invention are arranged to execute the first and second mechanism. In some aspects, the apparatus is configured to execute a first mechanism to adapt a summarized resource independently of other summarized resources, and to execute a second mechanism to adapt a summarized resource based on at least one other summarized resource.

Similarly, the method adapts the summarized resource (i.e. adapts an association of physical resources with a summarized resource) in the first and second mechanisms. The adapting of the first mechanism is independently of the other summarized resources, and the adapting of the second mechanism is based on, i.e. is calculated using, a measurement of other summarized resources.

Aspects of the invention are independent for each domain, even though hierarchical routing and end-to-end traffic may involve further domains. Thus, aspects of the invention provide multi-vendor and multi-domain interworking, independent of the PCE and the control of each domain.

The physical resources have been described as intra-domain paths. The physical resources may alternatively or additionally refer to nodes, network elements, routers, switches, hubs, links, or any part of the summarized network.

The second mechanism 102 is arranged to trigger a domain to change the intra-domain routing. This provides a different distribution of the resources among the nodes. In some examples, the summarization method applicable is based on a full mesh among the border nodes 20. If a traffic load between a first pair of nodes (e.g. border nodes) is measured to require more resources than between a second pair of nodes (e.g. border nodes), the second mechanism provides for an increase in the amount of resources between the first pair of nodes, and a decrease in the amount of physical resources between the second pair of nodes. In this case, the second mechanism operates at fixed time slots to distribute the amount of physical resources in different way. The second mechanisms triggers the summarization domain method (irrespective of what that summarization method is) to adapt the resource distribution according to E2E needs.

Aspects of the invention comprise the first and second mechanisms 101,102, a combination of the first and second mechanisms, the independence of the first and second mechanisms and/or the independence of the first and second mechanisms from the E2E traffic demand. The first and second mechanisms are based on measurement of minimum set of parameters (e.g. critical state for the first mechanism and rate of variation of the critical state for the second mechanism). Aspects of the invention are independent of the control, e.g. NMS, of the domain. The first and second mechanisms may carried out centrally within a domain 10.

Figure 5:
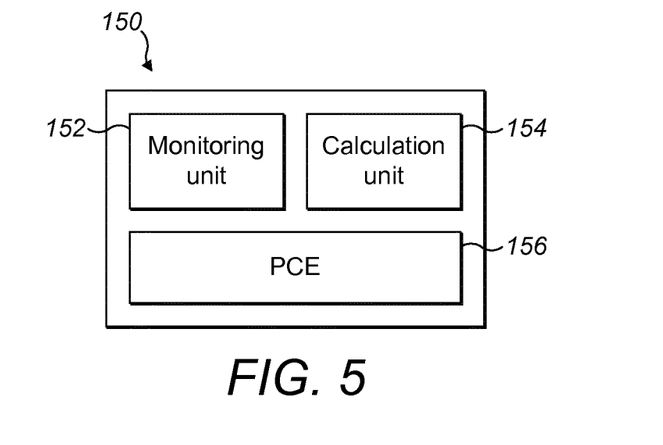
FIG. 5 shows an apparatus according to an example of the invention.

FIG. 5 shows a schematic illustration of an apparatus 150 according to an example of the invention. The apparatus 150 comprises one or more functional units configured to carry out examples of the method described.

In the example shown, the apparatus 150 comprises a monitoring unit 152. The monitoring unit 152 is arranged to monitor the physical resources of the summarized resources. The monitoring may comprise receiving information from one or more of the physical resources on the handling of traffic.

The apparatus 150 comprises a calculation unit 154. The calculation unit 154 is configured to receive the monitoring information from the monitoring unit 152. The calculation unit 154 is configured to determine if the summarization should be triggered, e.g. according to the first or second mechanism, based on the monitoring, a clock, or other measurement. The calculation unit 154 is configured to carry out the method functions described above, e.g. comparison of summarized resources. In some examples, the calculation unit 154 is configured to calculate the re-distribution, physical resource discovery and/or provisioning, as described above. In some aspects, the calculation unit 154 carries out the summarization phase.

In the example shown, the apparatus 150 comprises the Child PCE 156. The child PCE 156 is integrated with, or housed together with, the monitoring unit 152 and calculation unit 154. The calculation unit 154 and PCR 156 are connected. Alternatively, one or more of the monitoring unit 152, calculation unit 154 and PCE 156 are not located together. For example, the monitoring unit 152 and/or calculation unit 154 are located in any network node, management system (e.g. NMS) or node connected to the network or domain.

The child PCE 156 performs the usual PCE functions. In addition, the PCE 156 may carry out one or more of the functions described for the calculation unit 154 and/or monitoring unit 152. For example, the calculation unit 154 and/or monitoring unit 152 may be considered as functional units of the PCE.

In some examples, one or more of the monitoring unit 152, calculation unit 154 and PCE 156 may be integrated together. In some aspects, the monitoring unit 152, calculation unit 154 or PCE 156 may be implemented as hardware, software and/or firmware. The apparatus 150 comprises one or more processing unit, and optionally a memory, in order to implement the functions of the monitoring unit 152, calculation unit 154 and/or PCE 156.

Aspects of the present invention comprise a computer program or computer program product, configured to run on a computer or processing unit, to carry out at least some of the functions described. In some examples, one or more of the monitoring unit 152, calculation unit 154 and PCE 156 may be implemented in a network node, NMS, or in any apparatus connected to the domain or network.

Aspects of the invention provide efficient E2E routing (traffic Engineering). For example, the E2E routing provides the list of autonomous system (domains) to cross, to optimize the E2E routing. Aspects of the invention provide for dynamically adapting to traffic and/or network changes. Examples of the invention can be implemented whatever the technology and control of each domain. Aspects of the invention provide the capability to dynamically react to network and/or traffic changes. The examples above have used changes in traffic to indicate when the first and second mechanisms are triggered, and the resultant changes in summarization. Alternatively or in addition, the same first and second mechanisms are applicable to changes in the network, for example, the removal, failure or change of a link or node. The available physical resources may be changed with such a change in the network, and will be measured by the first and second mechanisms 101,102 as above. Aspects of the invention provide for dynamic adaptation of both routing and summarization to network and/or traffic changes.

Aspects of the invention allow adapting the summarized resources according to a current requirement of the routing or traffic. In some examples, the association of physical resources with a particular summarized resource (i.e. virtual link as used by the Parent PCE) are changed. The summarized resource can be considered as comprising the associated physical resources. For example, the associated physical resources are the physical resources which are configured to handle traffic routed on that summarized resource. The adaptation of the summarized resource comprises the adaptation of the summarization, i.e. in the sense that the summarization is a summary of different physical resources. The physical resources themselves may or may not be changed by this adaptation. The child PCE is notified (and optionally generates) this adaptation of the summarized resources. Therefore, the child PCE is able to route traffic on the summarized resource according to the adapted set of physical resources which are associated with the summarized resource. Thus, it is the logical grouping of physical resources which are considered as a summarised resource which is changed by examples of the invention.

In some examples, the summary of the physical resources as seen by the Parent PCE is adapted. In this case, the Parent PCE is provided with a different summary. In other examples, the different physical resources associated with the summary do not affect the summary seen by the Parent PCE. In this case, the Parent PCE would generally not be notified.

Aspects of the present can be applied to any network node or product. The method described may be carried out by any network node or element attached to the network. For example, aspects of the invention may be implemented by a router, e.g. providing fixed and mobile network infrastructure, IP/MPLS edge routing, and/or Evolved Packet Gateway functionalities. Aspects of the invention may be implemented on or monitor a network element or node providing packet optical transport. The network monitored may be a Software Defined Network (SDN).

Aspects of the invention provide a method and apparatus to make summarization and routing methods asynchronous. The decoupling of summarization and routing allows a decrease in the entire computation time. This allows the summarization method to react to unpredictable traffic changes, typical of a dynamic scenario. In some examples, the monitoring 100 does not directly monitor the E2E traffic. The monitoring 100 measures the ability of the physical resources to handle the E2E. This monitoring can be carried out without knowledge of the original source and/or final destination of the traffic.

In some aspects, according to the hierarchical PCE framework, the parent PCE computes the E2E path on the E2E summarized topology. Every time a path is selected, each link of the E2E path can corresponds to a path in a domain 10. This is communicated to the Child PCE and the child PCE provide the corresponding physical paths corresponding to the same summarized link. This means that the variation of the physical paths corresponding to a summarized link (a basket) depends on the E2E routing.

In case more resources are required in certain portion of the domains 10 with respect to other portions (baskets), the Child PCE is arranged to provide more paths in a basket with respect to other baskets if required. In this case the cause is the E2E routing, in the sense that the choice of a virtual link in a domain is performed by the Parent PCE considering E2E routing. The domain performs the adaptation of the physical resources in a summarized link, without any knowledge of the overall E2E routing, i.e. what is occurring in the other domains. Thus, in a hierarchical network, the resources are adapted within a domain without knowledge of the E2E routing.

Aspects of the invention allow scalable multi-domain routing. Examples of the invention provide for dynamic adaptation to E2E traffic and a network of internal domain routing. A corresponding summarization change without any knowledge of the E2E information is provided. Aspects have the invention have minimum impact on the node implementation. Examples are applicable to a SDN framework, e.g. in the case of multi-domain interworking.

The present examples provide a solution for efficient and scalable for multi-domain routing in case of hierarchical approach. Examples of the invention provide a traffic engineered E2E route. The solution allows each domain to dynamic perform the internal routing and summarized topology construction according to traffic and network change without an accurate knowledge of the E2E network and traffic status. Moreover the solution allows minimizing the operations required in the domain. The present proposal provides an efficient solution that allows fitting the domain summarization to E2E traffic and network variation without any knowledge of the E2E information. Aspects of the invention provide for the internal summarization to be carried out without knowledge of the other domains, and provide TE E2E routing.

Aspects of the invention have been described as comprising the first and second mechanisms. Alternatively, examples of the invention comprise only one of the first or second mechanisms. In a further example, the method and apparatus comprise a combination of any of the features described. For example, an adaptation could be triggered if a parameter threshold is met more than a pre-determined number of times in a moving window of time. For example, the adaptation is triggered if the available physical resources are below a threshold a particular number of times within a pre-determined amount of time. Alternatively, the adaptation is triggered if the not served demand (third parameter) exceeds a threshold. The adaptation may involve only summarized resource, or may involve a comparison of summarized resources.

The second mechanism is described as based on two parameters. Alternatively, the second mechanism is based on only one of the described parameters. The first or second mechanisms may utilise any of the parameters described, or any other parameter. For example, any parameter relating to handling of traffic by the physical resources, e.g. number of available physical resources. Alternatively, any parameter may not relate to handling of traffic, or may not be defined as relating to handling of traffic.

Aspects of the invention relate to adapting the summarized resource based on the monitoring of one or more parameters. The adapting based on the parameter may refer to a triggering of the adapting based on the parameter (e.g. as in the first mechanism) or to determining an adaptation of which physical resources are associated with a summarized resource based on the one or more parameters (e.g. as in the second mechanism).

The monitoring method described is based on simple measurement of basket parameters. Hence the mechanisms are simple to implement, scalable and with minimum impact on the domains.

The parallelization of summarization and routing phases allows creating a new virtualized topology, where the Parent PCE will route the future service requests, while the routing phase (Parent PCE) is running. In this way the routing phase is able to route the current service request, on the actual virtualization, and serve the future request without waiting the necessary computation time for the new network status summarization. The method needs as input parameters physical resource evaluations to configure the baskets status; it represents the number of resources (e.g. intra-domain paths) which are used by the child PCE for summarizing the domain.

The invention may be defined in the claims by any combination of features described. Any aspect of any embodiment may be combined with any feature of any other embodiment.

The invention claimed is:

1. A method of adapting an association of physical resources with a plurality of summarized resources corresponding to a virtual topology of a domain in a hierarchical routed network, the method comprising:

allocating the physical resources to the plurality of summarized resources in the domain;

monitoring a status of the allocated physical resources within the domain, wherein the monitoring comprises monitoring demand for the allocated physical resources associated with each of the plurality of summarized resources within the domain in the hierarchical routed network; and redistributing the allocation of physical resources among the plurality of summarized resources in dependence on the monitored demand, wherein the redistributing is performed without allocating previously unallocated physical resources to the plurality of summarized resources.

2. The method of claim 1, wherein monitoring the demand comprises monitoring, for each summarized resource, an amount of available physical resources among the allocated physical resources, and wherein redistributing the allocation is responsive to detecting that an amount for at least one summarized resource is at or below a predefined threshold.

3. The method of claim 2, wherein redistributing the allocation responsive to detecting that the amount is at or below the predefined threshold comprises increasing the allocation, at least to an extent that allocable physical resources are available.

4. The method of claim 2, wherein redistributing the allocation comprises rebalancing the allocations in dependence on the respective demands, such that the allocations for summarized resources having higher demands are increased and the allocations for summarized resources having lower demands are decreased, at least when an amount of unallocated physical resources is insufficient for increasing the allocations to the summarized resources having the higher demands.

5. The method of claim 1, wherein monitoring the demand comprises, over a predetermined time interval, counting instances at which an amount of available physical resources among the allocated physical resources for a particular summarized resource falls below a first predetermined threshold, and wherein redistributing the allocation for the particular summarized resource is responsive to the count exceeding a defined value.

6. The method of claim 5, wherein monitoring the demand further comprises detecting when the amount of available physical resources among the allocated physical resources for the particular summarized resource falls below a second predetermined threshold that is lower than the first predetermined threshold, and wherein redistributing the allocation for the particular summarized resource comprises increasing the allocation responsive to the detecting.

7. The method of claim 1, wherein monitoring the demand comprises determining that a demand for a particular summarized resource is underserved by the allocated physical resources, and wherein redistributing the allocation comprises increasing the allocation for the particular summarized resource at least to meet the demand, in response to the determining.

8. The method of claim 1, wherein the monitoring is independent of routing of traffic.

9. The method of claim 1, wherein the physical resources are paths within the domain.

10. The method of claim 1, wherein the domain is one among a plurality of domains comprising the hierarchical routed network, and wherein the method further includes performing said allocating, monitoring, and redistributing on a per-domain basis, and further includes providing a traffic engineering end-to-end routing across the plurality of domains.

11. An apparatus configured for adapting an association of physical resources with a plurality of summarized resources corresponding to a virtual topology of a domain in a hierarchical routed network, the apparatus comprising processing circuitry and associated interface circuitry that are collectively configured to:

allocate the physical resources to the plurality of summarized resources in the domain;

monitor a status of the allocated physical resources within the domain, wherein to monitor the status, the processing circuitry is configured to monitor demand for the allocated physical resources associated with each of the plurality of summarized resources within the domain in the hierarchical routed network; and redistribute the allocation of physical resources among the plurality of summarized resources in dependence on the monitored demand, wherein the redistribution is performed without allocating previously unallocated physical resources to the plurality of summarized resources.

12. The apparatus of claim 11, wherein the processing circuitry is configured to monitor the demand by monitoring, for each summarized resource, an amount of available physical resources among the allocated physical resources, and to redistribute the allocation responsive to detecting that an amount for at least one summarized resource is at or below a predefined threshold.

13. The apparatus of claim 12, wherein the processing circuitry is configured to redistribute the allocation responsive to detecting that the amount is at or below the predefined threshold by increasing the allocation, at least to an extent that allocable physical resources are available.

14. The apparatus of claim 12, wherein the processing circuitry is configured to redistribute the allocation by rebalancing the allocations in dependence on the respective demands, such that the allocations for summarized resources having higher demands are increased and the allocations for summarized resources having lower demands are decreased, at least when an amount of unallocated physical resources is insufficient for increasing the allocations to the summarized resources having the higher demands.

15. The apparatus of claim 11, wherein the processing circuitry is configured to monitor the demand by, over a predetermined time interval, counting instances at which an amount of available physical resources among the allocated physical resources for a particular summarized resource falls below a first predetermined threshold, and to redistribute the allocation for the particular summarized resource responsive to the count exceeding a defined value.

16. The apparatus of claim 15, wherein the processing circuitry is configured to monitor the demand further by detecting when the amount of available physical resources among the allocated physical resources for the particular summarized resource falls below a second predetermined threshold that is lower than the first predetermined threshold, and to redistribute the allocation for the particular summarized resource by increasing the allocation responsive to the detecting.

17. The apparatus of claim 11, wherein the processing circuitry is configured to monitor the demand by determining that a demand for a particular summarized resource is underserved by the allocated physical resources, and to redistribute the allocation by increasing the allocation for the particular summarized resource at least to meet the demand, in response to the determining.

18. The apparatus of claim 11, wherein the processing circuitry is configured to monitor the demand independent of routing of traffic.

19. The apparatus of claim 11, wherein the physical resources are paths within the domain.

20. The apparatus of claim 11, wherein the domain is one among a plurality of domains comprising the hierarchical routed network, and wherein the apparatus is further configured to perform said allocate, monitor, and redistribute operations on a per-domain basis, and further configured to provide a traffic engineering end-to-end routing across the plurality of domains.

* * * * *